United States Patent [19]

Kawanami et al.

[11] Patent Number: 5,098,993
[45] Date of Patent: Mar. 24, 1992

[54] METHOD FOR REMOVING ALKALI METAL COMPOUND FROM CRUDE HIGH-MOLECULAR WEIGHT SUBSTANCE

[75] Inventors: Norio Kawanami; Yoshiaki Ikeda; Yoshio Tomishima, all of Hyogo, Japan

[73] Assignee: Kanegafuchi Kagaku Kogyo Kabushiki Kaisha, Osaka, Japan

[21] Appl. No.: 616,270

[22] Filed: Nov. 20, 1990

[51] Int. Cl.⁵ .............................................. C08F 6/16
[52] U.S. Cl. .................................... 528/502; 526/88; 526/123
[58] Field of Search ................... 528/502; 526/88, 123

[56] References Cited
U.S. PATENT DOCUMENTS 4,874,588 10/1989 Sortwell et al. .................... 528/502

Primary Examiner—John Kight, III
Assistant Examiner—Shelley A. Wright
Attorney, Agent, or Firm—Armstrong, Nikaido, Marmelstein, Kubovcik & Murray

[57] ABSTRACT

A method for purifying a crude high-molecular weight substance containing an alkali metal compound by extracting the alkali metal compound with water is disclosed, which comprises stirring a mixture comprising said crude high-molecular weight substance and water in a high-speed stirring tank to extract the alkali metal compound into an aqueous phase and separating the high-molecular weight substance phase and the aqueous phase from each other by continuous centrifugation. An alkali metal compound as an impurity can be efficiently removed with small-sized equipment in a short time.

9 Claims, 2 Drawing Sheets

METHOD FOR REMOVING ALKALI METAL COMPOUND FROM CRUDE HIGH-MOLECULAR WEIGHT SUBSTANCE

FIELD OF THE INVENTION

This invention relates to a method for removing an alkali metal compound from a crude high-molecular weight substance.

BACKGROUND OF THE INVENTION

A wide variety of high-molecular weight substances have hitherto been produced and used. High-molecular weight substances as produced (hereinafter referred to as crude high-molecular weight substances) are generally subjected to purification treatments to remove impurities contained therein.

Included in the impurities present in crude high-molecular weight substances are alkali metal compounds. Incorporation of an alkali metal compound into a high-molecular weight substance takes place in the following cases.

(1) In the production of oxyalkylene polymers by addition polymerization of an alkylene oxide (e.g., polypropylene oxide) or in the production of epoxy resins by reaction between bisphenol A and epichlorohydrin (e.g., bisphenol A-epichlorohydrin resin), an alkali metal compound used as a catalyst, e.g., sodium hydroxide and potassium hydroxide, remains in the produced high-molecular weight substance as it is or in the form of its salt.

(2) In the separation of high-molecular weight substances produced by emulsion polymerization, an alkali metal compound used for salting out is incorporated into the resulting high-molecular weight substance.

(3) In the reaction between a polymer containing a functional group, such as a oxyalkylene polymer containing a hydroxyl group or a carboxyl group or a diene polymer, and a halogen-containing compound, such as epichlorohydrin and allyl chloride, to produce a polymer having other functional group(s), an alkali metal compound used as a catalyst, e.g., sodium hydroxide and potassium hydroxide, remains in the resulting high-molecular weight substance as it is or in the form of its salt.

Besides the above-mentioned cases, there are many high-molecular weight substances having incorporated therein an alkali metal compound.

It is desirable that such an alkali metal compound remaining in high-molecular weight substances should be removed as sufficiently as possible to avoid possible adverse effects. For example, high-molecular weight substances for use as electronic parts should be purified to an extremely low alkali metal compound concentration since the existence of such an impurity causes reduction in electrical characteristics. Further, where a high-molecular weight substance is subjected to further reactions, the existence of an alkali metal compound sometimes adversely affects the reaction rate or yield.

Conventional techniques for removing an alkali metal compound from a high-molecular weight substance include (1) a treatment with an adsorbent, (2) a method comprising neutralizing the alkali metal compound with various acids to convert it to a different alkali metal compound, followed by filtration, and (3) extraction with water.

The method of using an adsorbent is unsuitable for removing a large quantity of an alkali metal compound. Moreover, there is only a limited choice in the kind of adsorbents which can be used for removal of alkali metal compounds in the form of a salt.

The method utilizing filtration requires growth of crystals of the neutralized salt. Should water be present, the salt would be dissolved.

From these and other reasons, the extraction method is preferred in many cases to the other two methods.

The extraction method comprises thoroughly contacting a crude high-molecular weight substance with water to transfer an alkali metal compound to an aqueous phase and separating the high-molecular weight substance from the aqueous phase. According to this method, the system is apt to be emulsified due to the presence of the high-molecular weight substance when subjected to, for example, vigorous agitation in order to obtain sufficient contact between the crude high-molecular weight substance and water. As a result, separation of the high-molecular weight substance from water takes much time, or large-sized equipment is required for separation. If the system is mildly agitated to prevent emulsification, extraction of the alkali metal compound would be inadequate. Apparatus which is employed in general extraction methods includes spray tower, a packed column, a column of a multistage type, an agitation type or a reciprocating motion type, a continuous counter-current extraction column, e.g., a pulse column, and a centrifugal extractor. Separation of an alkali metal compound from a crude high-molecular weight substance by the use of these apparatus requires a very long time or only results in insufficient extraction of the alkali metal compound.

SUMMARY OF THE INVENTION

An object of this invention is to provide a method for extracting and removing an alkali metal compound from a crude high-molecular weight substance in a short time.

Another object of this invention is to provide a method for extracting and removing an alkali metal compound from a crude high-molecular weight substance in a short time by using a relatively small-sized apparatus.

A further object of this invention is to provide a method for removing an alkali metal compound from a crude high-molecular weight substance to obtain a purified high-molecular weight substance having a markedly reduced content of a residual alkali metal compound.

The above objects of this invention are accomplished by a method for purifying a crude high-molecular weight substance containing an alkali metal compound by extracting the alkali metal compound with water, which comprises stirring a mixture comprising said crude high-molecular weight substance and water in a high-speed stirring tank to extract the alkali metal compound into an aqueous phase and separating the high-molecular weight substance phase and the aqueous phase from each other by continuous centrifugation.

According to the present invention, contact of a crude high-molecular weight substance with water can be achieved very satisfactorily by stirring in a high-speed stirring tank whereby an alkali metal compound contained in the crude high-molecular weight substance can be efficiently transferred into an aqueous phase. Even if the system is emulsified through high-speed stirring, the high-molecular weight substance can easily be separated from water by the subsequent centrifugal separation.

DETAILED DESCRIPTION OF THE INVENTION

Figure 1:
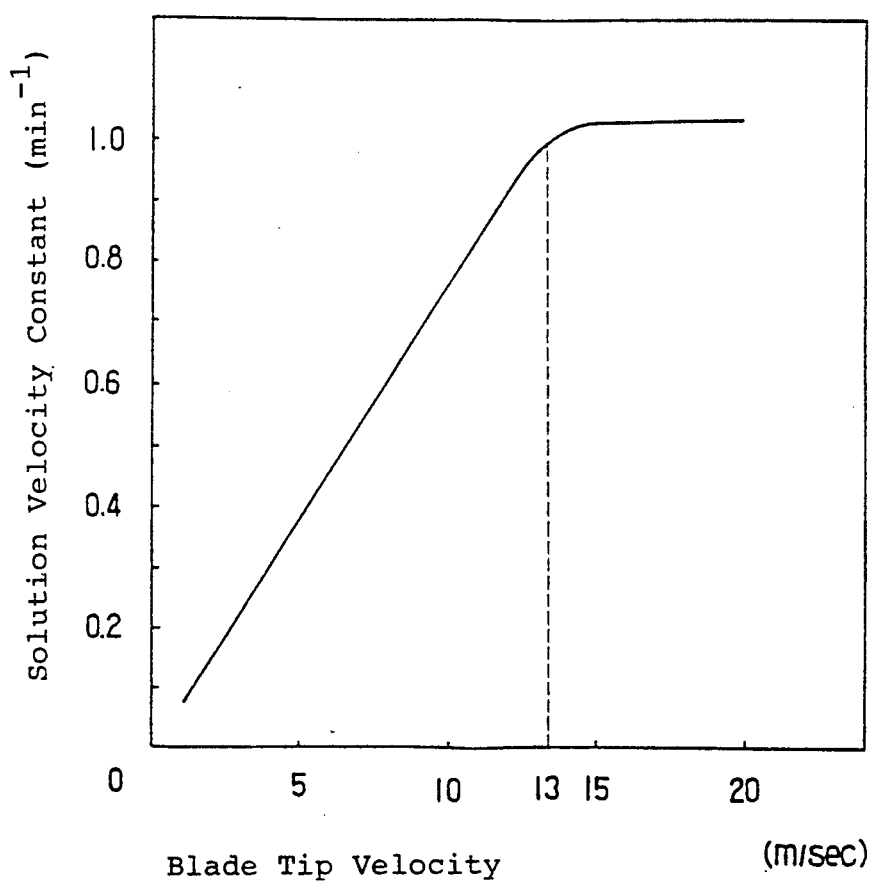
FIG. 1 is a graph showing a relationship between blade tip velocity of a high-speed stirring tank and solution velocity constant of an alkali metal compound.

The purification method of the present invention makes it possible to markedly reduce the content of the alkali metal compound remaining in the high-molecular weight substance. For example, the alkali metal compound concentration can be reduced to 5 ppm or less through a single treatment, and may be further reduced to an extremely low level by repeating the treatment twice or more.

Crude high-molecular weight substances containing an alkali metal compound to which the method of the present invention is applicable are not particularly limited, and any kind can be treated. In particular, the method of the present invention is suitably applied to a substantially water-insoluble crude high-molecular weight substance in which the high-molecular weight substance has a water solubility of not more than 0.5 g/100 g-$H_2O$. The method is also applicable to a water-soluble crude high-molecular weight substance as well by using a water-incompatible solvent. In cases of treating solid crude high-molecular weight substances or crude high-molecular weight substances having a high viscosity, it is necessary to employ a solvent capable of dissolving the high-molecular weight substance.

Typically included in the crude high-molecular weight substances which can be purified by the method of this invention are crude oxyalkylene polymers, crude butadiene polymers, crude epoxy polymers, crude acrylic ester polymers, crude methacrylic ester polymers, and crude vinyl acetate polymers. These polymers may be either homopolymers or copolymers. High-molecular reaction products can also be treated.

Of these polymers, oxyalkylene polymers possess properties as surface active agents so that they are apt to form an emulsion system when stirred with water. Crude oxyalkylene polymers in particular show this tendency, often making it difficult to adopt the conventional extraction methods. Hence, the method of the present invention is especially suited for purification of crude oxyalkylene polymers.

Oxyalkylene polymers are polymers comprising a repeating unit represented by —R—O— in a major proportion (i.e., 50% by weight or more, preferably 80% by weight or more), wherein R represents —$CH_2CH_2$—, —$CH(CH_3)CH_2$—, —$CH(C_2H_5)CH_2$—, —$C(CH_3)_2CH_2$—, —$(CH_2)_4$—, etc.

While not being particularly limited, the molecular weight of the high-molecular weight substances preferably ranges from about 500 to about 1,000,000, and more preferably from 2,000 to 15,000.

The alkali metal compound to be removed, which originates in the catalyst used for polymerization or modification of high-molecular weight substances and remains in the crude high-molecular weight substance as it is or in a converted form, includes alkali metals, e.g., Na and K; alkali metal hydrides, e.g., NaH; alkali metal alkoxides, e.g., $NaOCH_3$ and $NaOC_2H_5$; caustic alkalis, e.g., caustic soda and caustic potash; organic salts of a basic alkali metal compound with organic acids (e.g., carboxylic acids), e.g., HCOONa, CH:COONa, $C_2H_5COONa$, HCOOK, $CH_3COOK$, and $C_2H_5COOK$; and inorganic salts of a basic alkali metal compound with inorganic acids (e.g., hydrohalogenic acids, sulfuric acid), e.g., NaCl, $Na_2SO_4$, $Na_2CO_3$, $NaHCO_3$, $Na_3PO_4$, $Na_2HPO_3$, $NaNO_3$, KCl, $K_2SO_4$, $K_2CO_3$, $KHCO_3$, $K_3PO_4$, $K_2HPO_3$, and $KNO_3$. Among these alkali metal compound, an alkali metal sulfate is the most preferable. Metallic Na, K, etc. included in the above-recited category "alkali metals" are generally present in the form of a compound thereof in the crude high-molecular weight substances being extracted and therefore deemed to be included under the category "alkali metal compounds" in the present invention. Of the above alkali metal compounds, NaH, $NaOCH_3$, etc. are not extracted into water as such but in the form of other alkali metal compounds.

While no solvent is needed where the crude high-molecular weight substance to be treated has a low viscosity, it is generally preferable to use a solvent capable of dissolving the crude high-molecular weight substance but substantially insoluble in water (i.e., forming a separate phase from water).

Suitable solvents which can be used in the present invention include aliphatic, alicyclic or aromatic hydrocarbons, halogenated hydrocarbons, ethers, and halogenated ethers. Specific but non-limiting examples of these solvents are butanes, pentanes, hexanes, heptanes, octanes, nonanes, decanes, dodecanes, cyclohexane, cyclopentane, benzene, toluene, xylenes, butanol, pentanol, methyl ether, ethyl ether, isopropyl ether, methylene chloride, methylchloroform, carbon tetrachloride, dichlorodifluoromethane, perchloroethylene, and benzene or toluene type solvents substituted with one or more of chlorine, bromine and iodine atoms. These solvents may be used either individually or in combination of two or more thereof.

In the present invention, there must be a difference in density between a high-molecular weight substance phase (organic phase) and an aqueous phase before these phases could be separated by centrifugation. The difference in density is not particularly limited as far as the two phases can be separated from each other, but is preferably 0.02 g/$cm^3$ or more, and more preferably 0.05 g/$cm^3$ or more, for easy separation. Use of the above-described solvent is effective to produce such a difference in density between phases.

The amount of the solvent to be used is not substance can be dissolved. In general, the solvent is used in amount of from 100 to 1,000 parts, preferably 150 parts or per 100 parts by weight of the crude high-molecular weight substance. As the proportion of the solvent to the crude high-molecular weight substance increases, the viscosity of the organic phase is decreased, which increases the rate of phase separation and facilitates separation of the alkali metal compound-containing aqueous phase but, in turn, is disadvantageous for the subsequent solvent recovery step.

The amount of water to be used is not particularly limited. Water may be used in any proportion as long as the alkali metal compound in the crude high-molecular weight substance can be extracted to a desired degree and the organic phase and the aqueous phase can be separated. However, too small proportion of water makes phase separation difficult or fails to efficiently extract the alkali metal compound. For this reason, water is preferably used in an amount of from about 100 to about 1,000 parts, and more preferably from about 200 to about 1,000 parts, by weight per 100 parts by weight of the crude high-molecular weight substance.

In the present invention, the crude high-molecular weight substance and water are stirred in a high-speed stirring tank. While a high-speed stirring tank has not usually been employed for extraction, especially extraction of impurities from a crude high-molecular weight substance, efficient contact between the crude high-molecular weight substance and water and efficient extraction can be achieved by the use of a high-speed stirring tank.

The high-speed stirring tank which can be used in the present invention includes a stirring tank with stirring blades having a blade tip velocity of 10 m/sec or more, preferably from 13 to 20 m/sec. If the blade tip velocity is less than 10 m/sec, the rate of extraction of the alkali metal compound into the aqueous phase is reduced, and the efficiency of dissolution and extraction tends to decrease. If it exceeds 20 m/sec, the cost of power required for stirring increases and becomes uneconomic.

FIG. 1 is a graph showing a relationship between the blade tip velocity and a solution velocity constant of an alkali metal compound in water. The solution velocity constant was experimentally obtained according to equation:

$$Cw/Cw_{\infty} = 1 - \exp(-kt)$$

wherein Cw is a concentration (g/l) of an alkali metal compound in an aqueous phase; $Cw_{\infty}$ is a concentration of an alkali metal compound in an aqueous phase, assuming that all the alkali metal compound in a crude high-molecular weight substance has been transferred into the aqueous phase; t is a time (min); and k is a solution velocity constant $(\text{min}^{-1})$.

The experiments were conducted using a crude oxyalkylene polymer having a molecular weight ranging from 2,000 and 15,000 dissolved in a solvent at a polymer/water weight ratio of from 100/200 to 100/1,000 and at a polymer/solvent weight ratio of from 100/200 to 100/1,000.

The high-speed stirring tank to be used may be comprised of a single tank or a plurality of tanks. Further, a multistage single-tower type may be used. In order to prevent short-pass during continuous running and to assure high extraction efficiency, a multiple tank type and a multistage single tank type (2 to 20 stages) are preferred. An average retention time is preferably 5 minutes or more, and more preferably 10 minutes or more.

Figure 2:
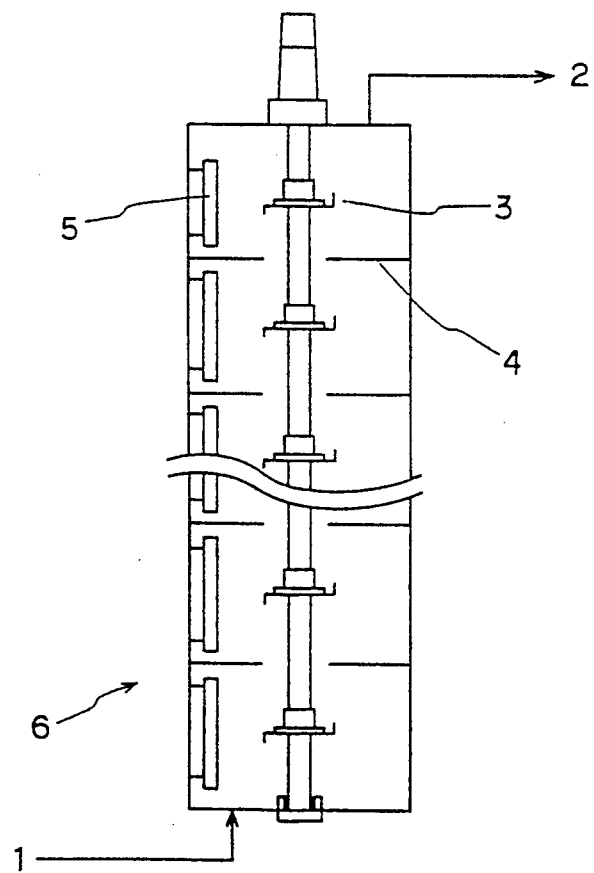
FIG. 2 illustrates a 10-stage high-speed stirring tank, an example of a high-speed stirring tank to be used in the present invention.

FIG. 2 illustrates a high-speed stirring tank of 10-stage single-tower type as an example of a multistage single-tower type.

A crude high-molecular weight substance, water and, if desired, a solvent are supplied from inlet (1) at the bottom of tank (6). Stirring tank (6) is divided into 10 stages by partitions (4). In each stage, hooked turbine blade (3) and two flat baffles (5) are fixed. Each blade revolves at a tip velocity of 10 m/sec, preferably from 13 to 20 m/sec, and the mixed liquid is made to flow while meeting obstacles in a completely emulsified state. The numeral (2) is an outlet through which the liquid is forwarded to a continuous centrifugal separator.

Thus, effective stirring can be accomplished in such a manner that the stirred liquid is emulsified by using the above-described high-speed stirring tank, and at the same time, the alkali metal compound in the crude high-molecular weight The terminology "emulsified state" as used herein means both an organic phase-in-aqueous phase emulsion and an aqueous phase-in-organic phase emulsion.

The temperature during stirring is not particularly limited. Temperatures at which handling is easy, for example, room temperature and temperatures at which separation is easily conducted are preferred.

It is preferable that the aqueous phase after stirring has a pH of not more than 3.0, more preferably from 1 to 2.5, and most preferably from 1.5 to 2, from the viewpoint of ease of separation into a high-molecular weight substance phase and an aqueous phase. As a matter of course, when the high-molecular weight substance is susceptible to change under such a pH condition, pH values out of this range can be used.

The thus obtained liquid in an emulsified state is then supplied to a centrifugal separator where it is continuously separated into a high-molecular weight substance phase (organic phase) and an aqueous phase.

The continuous centrifugal separator which can be used in the present invention is not particularly limited, and separation can be employed. In the case of treating a difficultly separable emulsion, there is a tendency that an intermediate substance phase is produced and accumulated onto the wall of the separator to hinder continuous running. Therefore, it is preferable to use a centrifugal separator that can easily be washed during continuous running and freed from accumulation of an emulsion, for example, a partitioned centrifugal separator, e.g., Nozzle Jector DHL Gravitroll manufactured by Sharpress K.K. Further, in order to treat a large quantity of a liquid in a short time, the centrifugal force (G) for separation is preferably 5,000 G, and more preferably 7,000 G or more.

The present invention is now illustrated in greater detail by way of Examples. All the percentages and ratios are given by weight unless otherwise indicated.

PREPARATION EXAMPLE

In 1 l-volume pressure resistant reaction vessel equipped with a stirrer whose atmosphere had been displaced with nitrogen was charged 320.0 g of polyoxypropylene glycol having a viscosity average molecular weight of 3,200 ("PP-4000" produced by Sanyo Chemical Industries Co., Ltd.), and 40.8 g of a sodium hydroxide powder (purity: 98%) was added thereto. After the inner temperature was elevated to 60° C., 7.76 g of bromochloromethane was added thereto, and the mixture was allowed to react at 60° C. for 10 hours. After the reaction mixture was cooled to 50° C., 9.2 g of allyl chloride was added thereto, followed by reacting at 50° C. for 10 hours to prepare allyl-terminated (both terminals) polyoxypropylene (hereinafter referred to as crude polyether (A)).

EXAMPLE 1

To a 8 l-volume 10-stage high-speed stirring tank having hooked turbine blades as shown in FIG. 2 was fed a polymer solution comprising a crude polyether (A) and n-hexane at a ratio of 100:300 at a rate of 31 l/hr and, at the same time, a 3% sulfuric acid aqueous solution was fed thereto at a rate of 17 l/hr. The mixture was stirred at a rate of 6,000 rpm (blade tip velocity: 15 m/sec). Subsequently, the mixture was subjected to liquid/liquid separation in a partitioned centrifugal separator at a centrifugal force of 8,000 G. n-Hexane was removed from the separated polymer solution by means of an evaporator to obtain a purified clear polyether (A)(hereinafter referred to as purified polyether $(A_1)$. The aqueous phase separated had a pH of about 1.8.

A viscosity average molecular weight of the resulting purified polyether $(A_1)$ was determined. Further, a residual Na content in the polyether $(A_1)$ was determined by atomic-absorption spectroscopy. The results obtained are shown in Table 1.

EXAMPLE 2

The polymer solution separated in Example 1 was again supplied to the same stirring tank as used in Example 1 at a rate of 31 l/hr together with 17 l/hr of a 3% sulfuric acid aqueous solution, and the mixture was stirred at a rate of 6,000 rpm (blade tip velocity: 15 m/sec). The treated liquid was subsequently subjected to continuous liquid/liquid separation in a partitioned centrifugal separator (centrifugal force: 8,000 G). n-Hexane was removed from the polymer solution thus separated, by means of an evaporator, to obtain a repurified transparent polyether (hereinafter referred to as purified polyether $(A_2)$). The aqueous phase separated had a pH of about 1.8.

The viscosity average molecular weight and the residual Na content (by atomic-absorption spectroscopy) of the purified polyether $(A_2)$) are shown in Table 1.

COMPARATIVE EXAMPLE 1

In a 8 l-volume separable flask equipped with a stirrer having Bru-Margin type blades was put 600 g of a crude polyether (A) and 1.8 kg of n-hexane, and 1.8 kg of 3% sulfuric acid was added thereto while stirring at a blade tip velocity of 3 m/sec. The stirring was continued for 1 hour, and after confirming that the pH of the mixture was about 1.8, the stirring was stopped. The mixture was allowed to stand for about 1 hour, whereby both an aqueous phase and an organic phase, became clear and separated from each other with a distinct and substantially foam-free interface therebetween. The organic phase was separated by decantation, and n-hexane was removed therefrom by means of an evaporator to obtain a purified polyether (hereinafter referred to as purified polyether $(A_3)$).

A viscosity average molecular weight and a residual Na content (as determined by atomic-absorption spectroscopy) of the resulting purified polyether $(A_3)$ are shown in Table 1.

TABLE 1

| Example No. | Viscosity Average Molecular Weight | Residual Na Content (ppm) |
| --- | --- | --- |
| Example 1 | 8,000 | 4 |
| Example 2 | 8,000 | 0.2 |
| Comparative Example 1 | 8,000 | 37 |

As described above, the method according to the present invention makes it possible to continuously obtain a high-molecular weight substance having an extremely low alkali treating time. The purified high-molecular weight substances obtained consistently provides high quality products.

While the invention has been described in detail and with reference to specific embodiments thereof, it will be apparent to one skilled in the art that various changes and modifications can be made therein without departing from the spirit and scope thereof.

What is claimed is:

1. A method for purifying a crude high-molecular weight substance containing an alkali metal compound by extracting the alkali metal compound with water, which comprises stirring a mixture comprising said crude high-molecular weight substance and water in a high-speed stirring tank to extract the alkali metal compound into an aqueous phase and separating the high-molecular weight substance phase and the aqueous phase from each other by continuous centrifugation.

2. A method as claimed in claim 1, wherein said high-speed stirring tank has a stirring blade having a blade tip velocity of 10 m/sec or more.

3. A method as claimed in claim 1, wherein said high-speed stirring tank has a stirring blade having a blade tip velocity of from 13 to 20 m/sec.

4. A method as claimed in claim 1, wherein said stirring is carried out in such a manner that the mixture of the crude high-molecular weight substance and water is emulsified.

5. A method as claimed in claim 1, wherein said continuous centrifugation is carried out at a centrifugal force of 5000 G or more.

6. A method as claimed in claim 1, wherein said continuous centrifugation is carried out at a centrifugal force of 7000 G or more.

7. A method as claimed in claim 1, wherein said crude high-molecular weight substance is a crude oxyalkylene polymer having a viscosity average molecular weight of from 500 to 1,000,000.

8. A method as claimed in claim 1, wherein said alkali metal compound is an alkali metal sulfate.

9. A method as claimed in claim 1, wherein said crude high-molecular weight substance is in a dissolved state in an organic solvent.

* * * * *